United States Patent [19]

Baxter et al.

[11] 4,316,693
[45] Feb. 23, 1982

[54] VARIABLE ARRAY CAN PALLETIZER

[75] Inventors: Donald J. Baxter; George J. Kolin, both of Vancouver, Wash.

[73] Assignee: Columbia Machine, Inc., Vancouver, Wash.

[21] Appl. No.: 17,179

[22] Filed: Mar. 5, 1979

[51] Int. Cl.³ .................. B65G 57/03; B65G 57/32
[52] U.S. Cl. .................................. 414/59; 198/486; 294/88; 294/115; 414/71
[58] Field of Search ............. 414/59, 71, 120, 416, 414/591; 198/458, 486; 294/88, 115

[56] References Cited

U.S. PATENT DOCUMENTS

| | | | |
|---|---|---|---|
| 3,302,967 | 2/1967 | Harris et al. | 294/87 R |
| 3,580,442 | 5/1971 | Rohdin et al. | 198/486 X |
| 3,687,306 | 8/1972 | Ransom | 414/120 |
| 3,690,715 | 9/1972 | Vanlingen et al. | 294/88 |
| 3,901,392 | 8/1975 | Streckert | 414/71 |
| 3,902,594 | 9/1975 | Schmitt | 198/379 |

Primary Examiner—Leslie J. Paperner
Attorney, Agent, or Firm—Kolisch, Hartwell & Dickinson

[57] ABSTRACT

Apparatus for transferring articles such as cans from a receiving station to a stacking platform to form a preselected article array on the platform. The apparatus includes a transfer carriage shiftable along a horizontal path between positions overlying the station and the platform, and a subcarriage mounted on the carriage for vertical shifting relative thereto. Mounted on the subcarriage for shifting in a substantially horizontal path extending transversely of the transfer carriage path are a plurality of carriers, each carrying an article-gripping device which includes a powered assembly mounted for limited vertical displacement relative to the subcarriage, and gripping members operatively connected to the assembly for movement, under the control thereof, between gripping and release positions. A sensor associated with at least one of the assemblies is operable to sense relative vertical movement between the assembly and the subcarriage, to signal a desired can loading or unloading operation.

3 Claims, 8 Drawing Figures

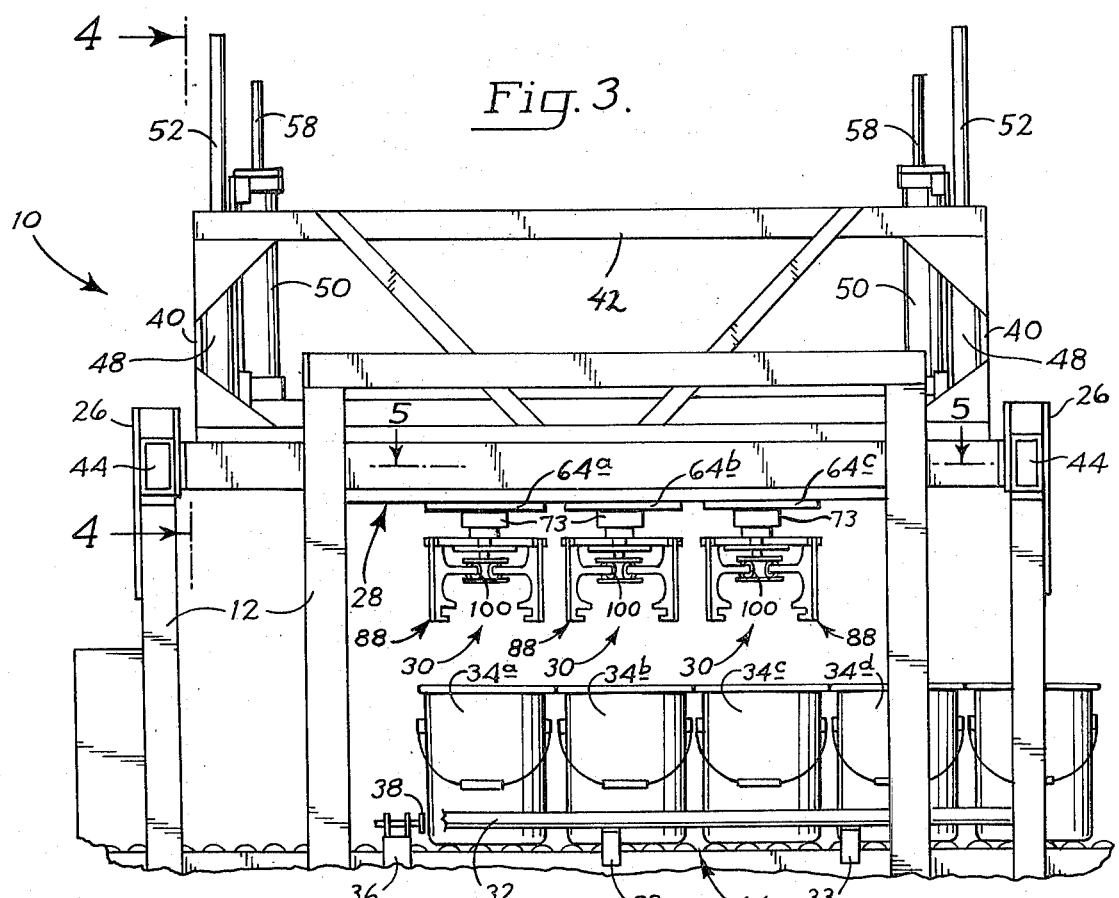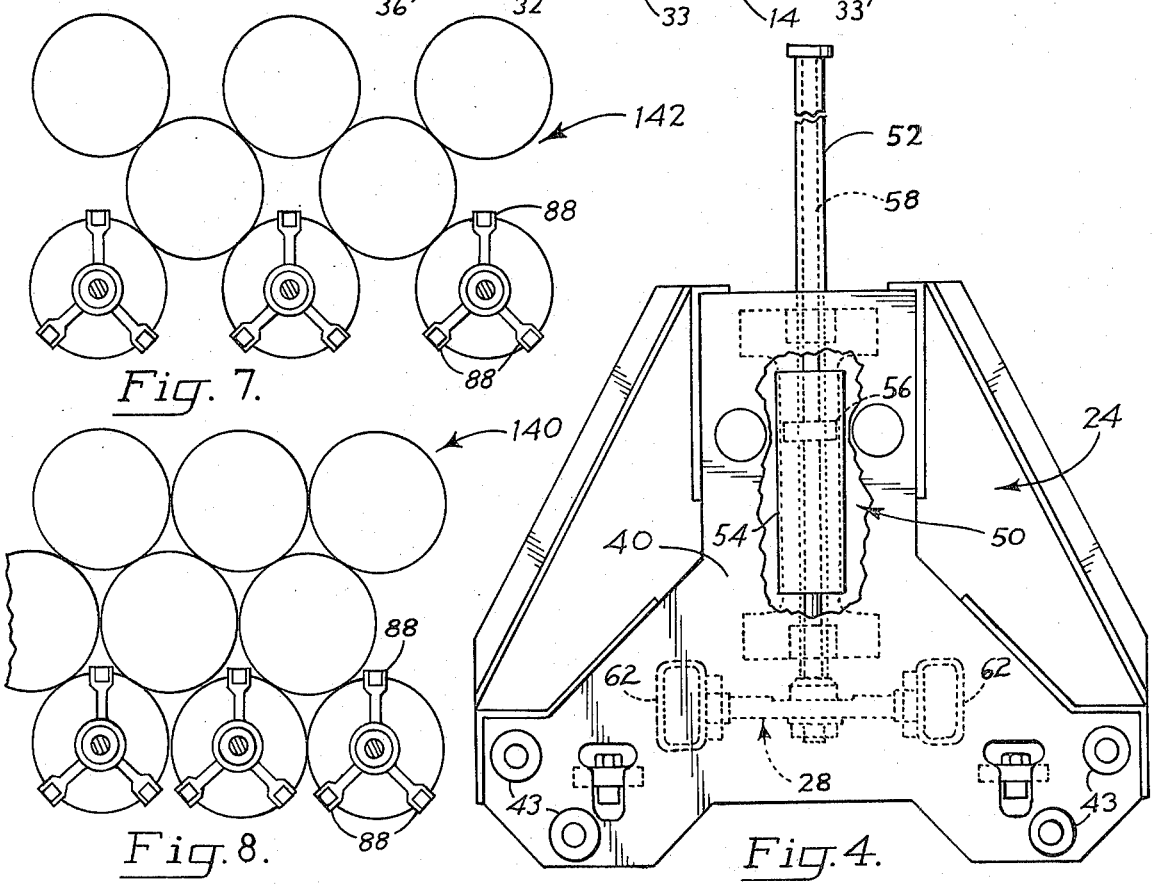

VARIABLE ARRAY CAN PALLETIZER

BACKGROUND AND SUMMARY

The present invention relates to apparatus for stacking articles such as cans and arranging the same in a preselected array on a stacking platform.

In stacking articles such as cans on pallets for storage and transport, it is desirable to arrange the cans in a selected space-saving configuration. This requires, in part, that the array of stacked cans on the pallet be selected to optimize the number of cans of a particular size which can be stacked on a pallet of a particular dimension, as will be explained herebelow. Secondly, in palletizing cans having bails attached thereto by projecting ears, it is advantageous to orient the cans in a preselected direction which avoids contact between such bails and adjacent cans.

Can palletizing apparatus which is designed to accomplish the latter bail-orienting prior to transferring the cans to a stacking platform is detailed in U.S. Pat. No. 3,902,594. Briefly describing this apparatus, it includes a loading, or receiving station onto which cans are loaded, in a compact linear array, by an infeed conveyor, and a vertically shiftable stacking platform. Interposed between the loading station and the conveyor is a can-orienting device which is operable to rotate the cans to have a preselected desired orientation with respect to the can bails. A transfer carriage horizontally shiftable between the loading area and the stacking platform has mounted thereon, in a fixed registry corresponding to the spacing between cans in the loading station, a plurality of power-operated gripping devices.

In operation, the gripping devices are actuated to grip a row of cans in the loading station, the loaded transfer carriage is shifted to a suitable position overlying the stacking platform, and the gripping devices are actuated to release the cans onto a pallet supported on the stacking platform. Because the gripping devices in the just-described apparatus are mounted in fixed registry, the configuration of each layer of cans stacked on the pallet is necessarily a square or rectangular array of aligned rows and columns. Such array may be optimal for certain sizes of cans loaded on certain sizes of pallets. Generally, however, a stacking arrangement having offset adjacent rows, with the cans in each row being spaced apart, will be more space-efficient.

The palletizing apparatus of the present invention is designed for stacking cans in variable, preselected arrays. Related to this feature, the apparatus is adaptable to palletize cans of one of a variety of can diameters. A further important feature of the apparatus is a height-sensing mechanism whereby the machine can palletize cans of various heights without operator control.

The apparatus of the present invention includes a loading station having provision for can orienting, a vertically shiftable stacking platform, and a transfer carriage shiftable along a horizontal path between the loading station and the stacking platform. In addition, and unlike the palletizer described in the above-cited U.S. patent, the present invention includes a subcarriage mounted on the transfer carriage for vertical shifting relative thereto. A plurality of carriers are mounted on the subcarriage for shifting along a horizontal path substantially perpendicular to the direction of the first-mentioned horizontal path. Mounted on each carrier for shifting therewith is an article-gripping device including a powered assembly mounted for limited vertical displacement relative to the associated carrier, and gripping members operatively connected to the assembly for movement, under the control thereof, between gripping and release positions.

The apparatus further includes a sensor positioned on at least one of the carriers for sensing upward movement of the associated powered assembly relative to the carrier. This sensor is connected to a control device used in controlling the extent of shifting of the subcarriage in a downward direction and movement of the gripping members between gripping and release positions in response to information from the sensor.

One important object of the present invention is to provide novel apparatus for stacking articles such as cans in a preselected array on a stacking platform.

Another object of the present invention is to provide, in such a can palletizer, a novel height-sensing mechanism whereby the palletizer can palletize cans of various heights without operator adjustment.

Yet another object of the invention is to provide a can palletizer adaptable to palletize cans having one of a variety of diameters.

More generally, it is an object of the invention to provide a can palletizer capable of receiving cans of various sizes and heights and stacking these in preselected, variable configurations, or arrays, which are optimally space-saving.

These and other objects and features of the present invention will become more fully apparent when read in connection with the following detailed description of a preferred embodiment of the invention and the accompanying drawings.

DRAWINGS

FIG. 3 is a view taken generally along the line 3—3 in FIG. 2, but shown here with cans loaded on the receiving station.

FIG. 4 is a view, with parts cutaway, taken generally along the line 4—4 in FIG. 3.

FIGS. 7 and 8 show two different arrays of stacked cans producable by the palletizer of the present invention.

DETAILED DESCRIPTION OF THE PREFERRED EMBODIMENT OF THE INVENTION

Figure 1:
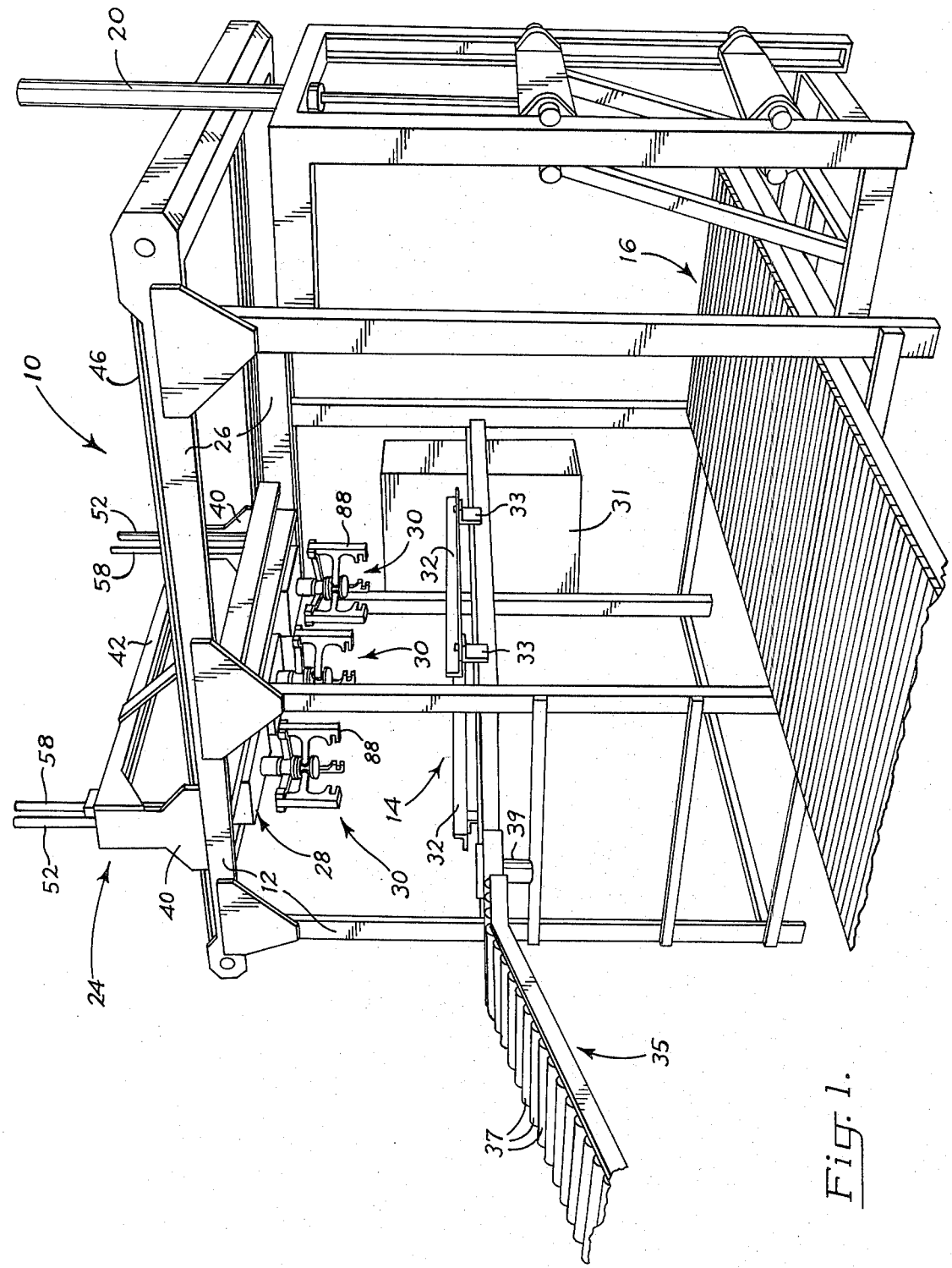
FIG. 1 is a perspective view of an article palletizer constructed according to a preferred embodiment of the invention, shown here with an attached infeed conveyor.
Figure 2:
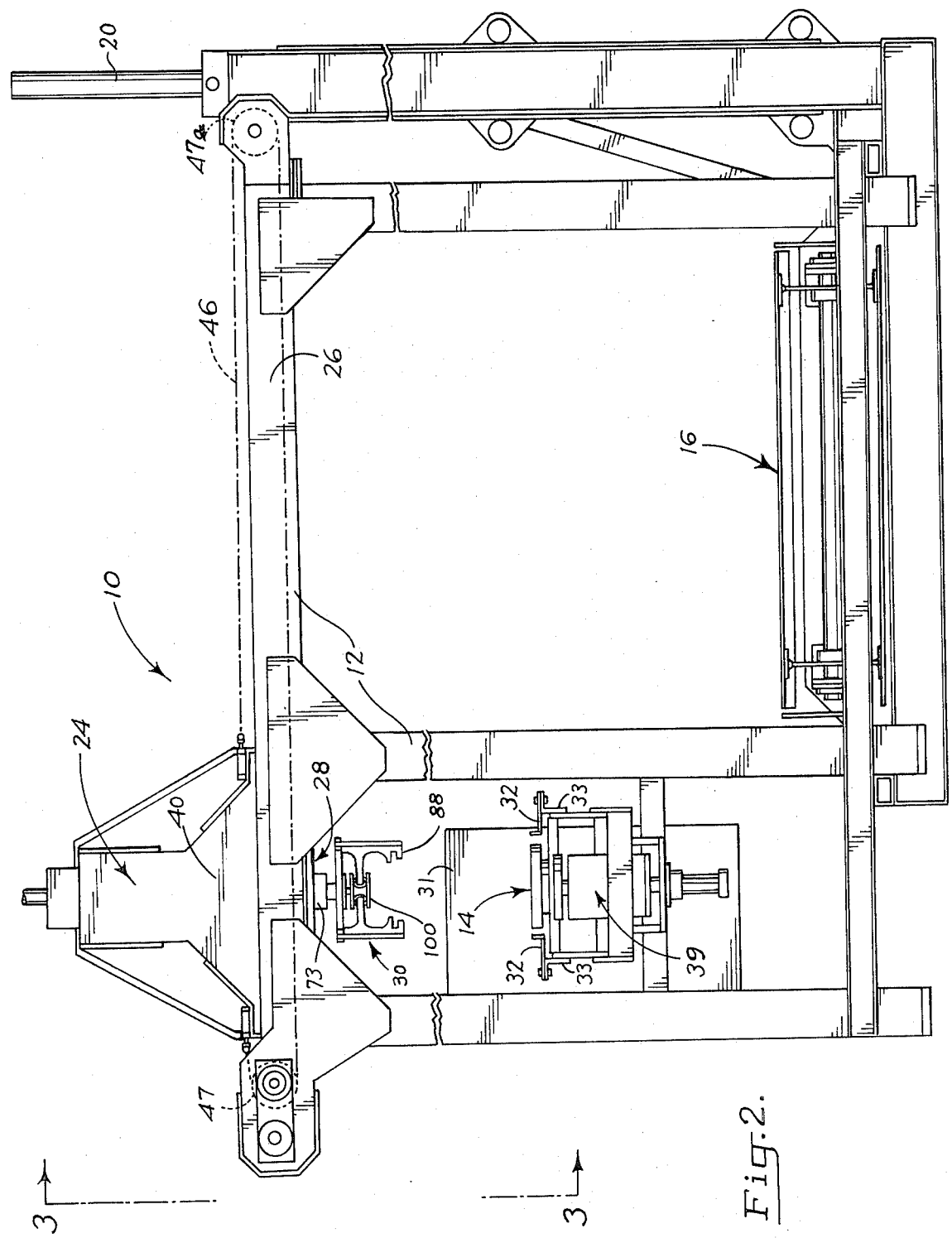
FIG. 2 is a side view of the palletizer of FIG. 1.

Referring now to the drawings, and first more particularly to FIGS. 1 and 2, at 10 is indicated palletizing apparatus constructed according to an embodiment of the invention. Apparatus 10 generally comprises a frame 12 on which is mounted a loading, or receiving, station 14, and a stacking platform 16, the latter being vertically shiftable, by a ram 20, as detailed in U.S. Pat. No. 3,902,594. Further included in apparatus 10 is a transfer carriage 24 which is shiftable along the upper frame beams 26 along a substantially horizontal path between positions overlying station 14 and platform 16. Mounted on carriage 24 for vertical shifting relative thereto is a subcarriage 28 supporting thereon, in a manner to be described, three relatively positionable article-gripping devices 30. As will be more fully explained below, the operation of apparatus 10 is controlled by control means including a microprocessor forming part of a control unit 31, with various machine-operating modes being selectable by input switches on the unit's panel (not shown), as is conventional.

Describing the apparatus in greater detail, station 14 includes, in addition to those features described with reference to U.S. Pat. No. 3,902,594, mounting members 33 (FIGS. 1 and 2) secured at opposite sides of station 14 for mounting adjustably thereon, opposed guide bars 32. Bars 32 extend longitudinally along a substantial portion of station 14 from the infeed side, forming a guideway which serves to guide cans, such as cans 34a, 34b, 34c and 34d in FIG. 3 along the longitudinal centerline of the receiving station. Bars 32 are adjustable toward and away from one another to vary the width of the guideway to accommodate cans of various diameters.

Articles such as cans are loaded onto station 14 by a conveyor 35 (FIG. 1) having power-driven rollers 37. Interposed between conveyor 35 and station 14 is a can-orienting device 39 which is operable, as cans are being transferred from the conveyor to the receiving station, to rotate the cans to preselected radial positions, such as that shown in FIG. 3. Details of conveyor 35 and device 39 are found in the above-mentioned U.S. patent.

With reference to FIG. 3, a contact switch 36 mounted adjacent the left end of guide bars 32, includes a slidably mounted contact bar 38 positioned to be contacted by a can, such as can 34a, at the left in FIG. 3, as cans are loaded onto station 14. Switch 36 is operatively connected, through the above-mentioned control means, to the power-driven rollers of the conveyor. As bar 38 is displaced upon contact with can 34a, switch 36 is placed in a condition signalling cessation of the conveyor rollers to interrupt the loading of cans onto the loading station.

With reference now to FIGS. 1–4, carriage 24 includes a rigid frame having a pair of opposed end plates 40 joined together at their upper ends by an elongate upper frame member 42. The lower portions of plates 40 are movably mounted by rollers 43 (FIG. 4) on tracks 44 (FIG. 3) in beams 26. A power-driven chain 46 (FIGS. 1 and 2) is trained about sprockets 47, 47a at opposite ends of each beam 26. The sprockets at one set of ends of the beams are rotated by a motor (not shown) and the chains are so connected to plates 40 that movement of the chains in one direction produces shifting of the carriage in a front-to-back, or left-to-right direction in FIG. 2, and countermovement of the chains produces shifting of the carriage in the opposite direction.

Figure 5:
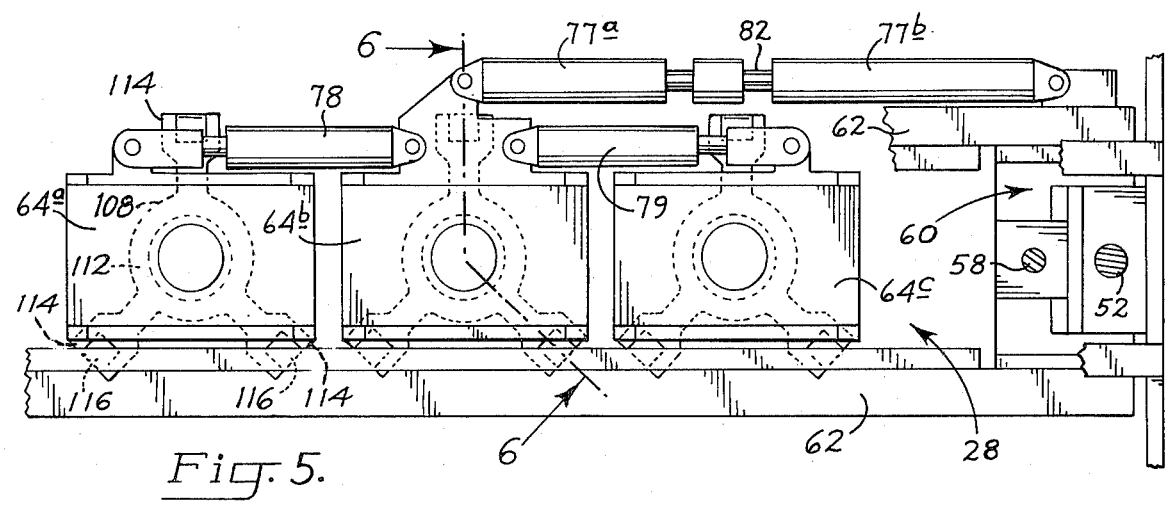
FIG. 5 is a top view of the carriage of the present invention, taken generally along line 5—5 in FIG. 3 with portions broken away.

Mounted on opposite sides of the carriage, adjacent each plate 40, for mounting subcarriage 28 to carriage 24 for vertical shifting relative thereto, in a manner to be described, are guide members 48 and double-acting rams 50 (FIG. 3). Members 48 provide elongate, cylindrical, lubricated guideways slidably receiving therethrough associated guide bars 52 which support, at their lower ends, opposed ends of the subcarriage (FIG. 5). With particular reference to FIG. 4, each ram 50 includes a hydraulic cylinder 54 and a piston 56 shiftable therein upon supply and exhaust of hydraulic pressure, by conventional means. Piston 56 is secured to an elongate rod 58 extending along the longitudinal axis of cylinder 54 and projecting from the opposite ends thereof. As seen best in FIGS. 4 and 5, the lower end of each rod 58 is attached to an associated side of subcarriage 28, adjacent associated guide bar 52.

It can be appreciated from the above that when fluid under pressure is supplied to the lower portion of cylinders 54, rods 58 and attached subcarriage 28 are raised. Conversely, the subcarriage is lowered when fluid is exhausted from the lower portion of the two cylinders. Cylinders 54 thus provide means for selectively shifting the subcarriage between raised and lowered positions. During such shifting, opposed guide bars 52, sliding within guide members 48, serve to stabilize the movement of the subcarriage in a vertical plane.

Looking now at the construction of subcarriage 28, with reference especially to FIGS. 4 and 5, the frame of the subcarriage may be thought of as including a pair of end members, such as member 60 shown in FIG. 5, and a pair of elongate, parallel beams or rails 62 extending therebetween. As seen in FIG. 5, end members 60 include that portion of the subcarriage to which the bottom ends of the associated guide bars 52 and rods 58 are attached. Beams 62 are preferably hollow tubes of rectangular cross section, as shown in FIG. 4, attached at the opposite ends thereof to the opposite sides of the two end members 60.

Figure 6:
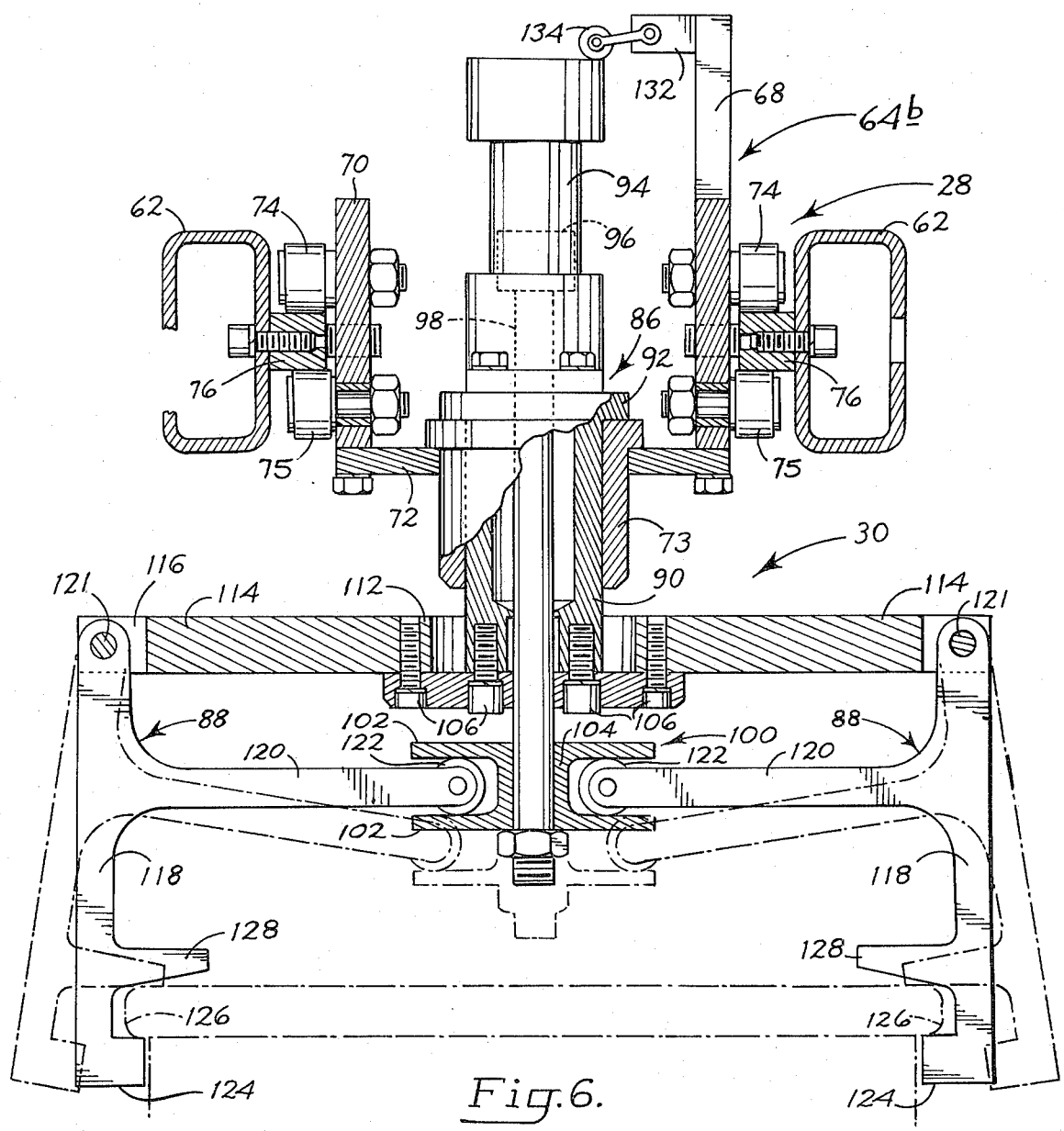
FIG. 6 is an enlarged, sectional, partially cutaway view of an article-gripping device, taken generally along the line 6—6 in FIG. 5.

Mounted on beams 62 for shifting therealong are three carriers 64a, 64b, 64c, each of which carries an associated gripping device 30 for shifting therewith. Each carrier includes what might be thought of as a J-shaped frame, as seen in FIG. 6, including opposed parallel side plates 68, 70 secured at their bottom edges to a lower plate 72. It is noted here that the sectional view of beams 62 and attached carrier 64b in FIG. 6 is along a straight line which includes the portion of line 6—6 in FIG. 5 which is perpendicular to beams 62 in this figure. Each carrier also includes, centrally of associated plate 72, a cylindrical sleeve 73 rigidly secured to this plate and extending through an opening therein. Sleeve 73 is used in slidably mounting associated device 30 to the carrier in a manner to be described. Attached to the outwardly facing sides of each plate 68, 70 are upper and lower rollers 74, 75, respectively, providing rolling support for the carrier on the opposed, inwardly projecting tracks 76, these tracks being rigidly secured to beams 62 in the manner shown.

Means for selectively shifting the carriers is shown in FIG. 5, and generally includes first and second powered positioning means including coupled rams 77a, 77b, and rams 78, 79, respectively. Ram 77a is connected at its left end in FIG. 5 to carrier 64b, and ram 77b is connected at its right in FIG. 5 end to the right-hand member 60 in this figure. A piston rod 82 is received in, and extends between, these two rams. Rams 78, 79 connect carriers 64a, 64c, respectively, to adjacent carrier 64b. All of the above-described rams are double acting and independently and selectively controllable.

As can be appreciated with reference to FIG. 5, extension or retraction of one or both of rams 77a, 77b serves to shift central carrier 64b to the left or right, respectively, in FIG. 5. Such movement, by reason of the ram coupling of carrier 64b to carriers 64a and 64c just described, acts to move all three carriers in the same direction and at the same rate. The coupling of rams 77a, 77b serves to extend the range and increase the speed of movement of carrier 64b along beams 62.

Independent activation of rams 78 or 79 serves to shift the position of carriers 64a or 64c, respectively, relative to carrier 64b along beams 62.

Describing now device 30, with particular reference to FIG. 6, each device includes a powered assembly, indicated at 86, which is slidably mounted within sleeve 73 for vertical shifting relative thereto, and a plurality of gripping members, or tongs 88, which are operatively connected to the assembly for movement, under the control thereof, between article-gripping and release positions, shown in solid and dot-dashed lines, respectively, in FIG. 6. Powered assembly 86 includes a mounting member 90 which is dimensioned to be slidingly received within sleeve 73, and which is flanged at its upper end 92 to provide support for the powered assembly on the upper surface of sleeve 73. Attached to end 92 is powered operating means including a double-acting ram 94 which is operable, through the movement of a piston 96, to raise or lower a rod 98 attached to the lower end of the piston. A shifting member 100, including a pair of horizontally disposed parallel discs, or plate portions 102, separated by a spacer portion 104 is secured to the bottom end of rod 98. Carried at the lower end of member 90 and secured thereto by bolts 106, is a mounting plate 108. As can be seen best in FIG. 5, plate 108 includes a central region 112 and three support arms 114 which occupy a substantially horizontal plane therewith and radiate outwardly therefrom at 90°, 135° and 135° angles with respect to one another. The end of each arm 114 is bifurcated, forming a slot 116 for mounting therein, in a manner to be described, an associated tong 88.

As seen in FIG. 6, tongs 88 are generally T-shaped members having substantially vertically disposed crossbars 118 integrally formed with operating arms 120 projecting perpendicularly therefrom. The tongs are detachably and pivotally mounted on the ends of associated arms 114 by pins 121. Thus mounted, the operating arms 120 of the three tongs project radially inwardly toward the center of the gripping device. Rollers 122 rotatably attached to the inwardly facing ends of the operating arms, and having diameters slightly less than the spacing between plates 102, ride within the annular space between these plates, coupling the tongs to member 100.

The ends of cross-bars 118, opposite the ends pivotally attached to the mounting plate, have inwardly facing gripping portions 124 for gripping the upper rim 126 of a can (dash-dot line in FIG. 6) when the tongs are moved to the gripping position shown in solid lines in FIG. 6. According to another important feature of the present invention, at least one of the three tongs additionally includes an engaging portion 128 integrally formed with the associated crossbar 18 a distance above associated portion 124 substantially equal to the height of rim 126.

Considering the operation of the gripping device shown in FIG. 6, when ram 94 is activated to lower piston 96, member 100 is moved to a lowered position shown in dash-dot lines in FIG. 6, causing tongs 88 to pivot radially outwardly to the positions shown in dash-dot lines, wherein portions 124 are spaced radially outwardly from rim 126 of a can and the ends of portions 128 are positioned to engage the top of the can. Conversely, when the ram is activated to raise piston 96, member 100 is raised, causing the tongs to pivot inwardly toward the position shown in solid lines in FIG. 6, wherein portions 124 grip the can below the rim, as shown.

It can be appreciated with reference to FIG. 6 that the tongs 88 described herein are suitable for gripping and sensing the height of a can having the particular diameter shown. As indicated above, the present apparatus is adaptable to palletize cans having different diameters. To this end, the tongs are detachably mounted on mounting plates 108 so that they can be easily removed, by removing pins 121, and replaced by tongs dimensioned for gripping cans having different diameters. Such tongs differ from the tongs 88 shown in FIG. 6 in that the lower portion of cross-bars 118, below arms 120, are suitably extended radially outwardly (or inwardly) from the upper portion of the cross-bars.

Completing the description of what is shown in FIG. 6, at least one of the carriers provides sensing means including a switch 132 mounted on the upper end of plate 68. Switch 132 is a conventional micro-switch having a roller toggle 134 positioned above the upper surface of ram 94, wherein upward displacement of assembly 86, relative to the associated carrier, activates the switch, changing the condition of the switch from a nominal to a sensing one. The switch is operatively connected to the control means above described for relaying thereto information relating to the condition of the switch to initiate a sequence of operations now to be described.

In operation, the control means is initially programmed, through settings on the control panel, to execute the operations involved in transferring cans of a particular diameter from the loading area to the stacking platform, and in particular, to control the operation of rams 77a, 77b, 78 and 79 to position carriers 64a, 64b, 64c at desired positions during the operation of the apparatus. When cans have been oriented and loaded onto station 14, as described above, carriage 24 is shifted to a position overlying the loading station, and the three carriers are shifted to positions in registry with the three cans leftmost on the loading area, as seen in FIG. 3. With the gripping devices in their release, or opened, positions, as illustrated in dot-dash outline in FIG. 6, subcarriage 28 and attached gripping devices 30 are lowered toward the cans until tong portions 128 contact the cans' upper rim portions. Such contact prevents further lowering of the tongs, while the subcarriage continues to move downwardly, producing relative upward movement of the associated powered assemblies, relative to the associated carriers. This movement, which, in each device 30, is accomplished by sliding of member 90 within sleeve 73 (FIG. 6), produces, in each device 30 having as associated switch 132, contact between the top of the device's ram 94 and the associated switch toggle 134. Switch 132 is then shifted to a sensing condition, relaying to unit 31 information which signals, in sequence, the cessation of downward shifting of the subcarriage and activation of rams 94 to place tongs 88 in their gripping positions (solid lines in FIG. 6).

It can be appreciated from the foregoing that the present invention automatically senses the height of the cans being palletized, with no operator intervention being required.

After the cans are gripped by the tongs, subcarriage 22 is raised by appropriate activation of rams 54 to a raised position, whereupon assemblies 86 shift, under gravity, to the positions shown in FIG. 6, and switch 132 returns to its nominal condition. The transfer carriage is shifted horizontally to transfer the gripped cans from the loading station to appropriate positions overlying the stacking platform.

During shifting of the transfer carriage, the rams controlling the relative positions of the carriers 64a, 64b and 64c are activated to shift the gripped cans to desired spaced-apart positions. By way of illustration, in FIG. 8, the first (uppermost) row of cans is produced by retaining the closely spaced configuration of the carriers used in gripping the cans at the loading station, whereas to produce the first (uppermost) row of cans in the configuration shown in FIG. 7, the three carriers are spread apart, relatively, by suitable activation of rams 78, 79, before the cans are unloaded onto the pallet.

With the transfer carriage shifted to the desired position overlying the stacking platform, and the carriers placed in the desired positions, as just described, the subcarriage is lowered, again through activation of rams 54, to move the cans toward the pallet on the stacking platform. Upon contact between the bottoms of the cans with the pallet, the tongs are again prevented from further lowering, causing upward movement of the associated mounting assemblies relative to the subcarriage. This movement signals, through a change in the condition of switch 132, as described above, the cessation of lowering of the subcarriage and the subsequent release of the grippings tongs, to deposit the cans on the pallet.

The subcarriage then is raised, and the transfer carriage is shifted back to a position overlying the loading station to pick up another row of cans. During such return shifting, the carriers are shifted back into registry with cans in the loading station. It is noted here that in the can array shown in FIG. 8, wherein adjacent offset rows of three cans each are formed, the three carriers are returned to positions shown in FIG. 3, wherein the three carriers are in registry with the three left-most cans to be transferred. In the configuration shown in FIG. 7, wherein rows of three cans are interspersed with rows of two cans, the carriers, when these are intended to grip two cans only, are all shifted to the left in FIG. 3, by suitable activation of rams 77a 77b to place carriers 64b, 64c, in registry with the two cans 34a, 34b, respectively, at the left in the same figure, with carrier 64a being located to the left of can 34a. Thus, only carriers 64b, 64c are employed in transferring two cans.

During the transfer and unloading operation, fresh cans are loaded onto the receiving station in the manner described above, such loading being initiated and terminated by switch 36 in the manner indicated above.

Following formation of one layer of cans on the pallet, the stacking platform is automatically lowered, by activation of ram 20 (FIG. 1), a distance roughly equal to the height of the cans, placing the partially loaded pallet in a suitable vertical position for receiving the next layer of stacked cans thereon.

A palletizer for stacking articles such as cans in preselected, variable arrays, and for sensing and adapting to the height of the cans without operator intervention, with the palletizer being adjustable to accommodate different diameter cans, has thus been disclosed. Various modifications and changes in the above-described palletizer can be made without departing from the spirit of the invention.

It is claimed and desired to secure by Letters Patent:

1. Apparatus for transferring a plurality of articles from a receiving station to a stacking platform to form on the platform a preselected array of articles, comprising
   a transfer carriage shiftable in a substantially horizontal path between positions overlying said station and said platform,
   subcarriage mounted on said carriage for vertical shifting relative thereto,
   subcarriage shifting means for shifting said subcarriage between raised and lowered positions,
   a pair of carriers, each mounted on said subcarriage for shifting in a substantially horizontal path relative to said subcarriage,
   carrier shifting means for selectively shifting said carriers, including first powered positioning means operatively interconnecting said subcarriage and one of said carriers for producing selected shifting therebetween, and second powered positioning means operatively interconnecting said one carrier and an adjacent carrier for producing selected shifting therebetween
   a pair of article-gripping devices, each device including a powered assembly mounted on an associated carrier for substantially vertical displacement relative thereto to accommodate downward travel of said carrier with respect to said device when the device initially contacts an article to be transferred, and gripping members operatively connected to said assembly for movement, under the control of the associate assembly, between gripping and release positions,
   sensing means operatively associated with at least one of said assemblies for sensing such downward travel of said carrier with respect to said device, and
   control means operatively connecting said sensing means with said subcarriage shifting means and said powered assemblies, for controlling shifting of said subcarriage toward its lowered position and movement of said gripping members between their gripping and release positions, upon such sensing occurring.

2. The device of claim 1 wherein said sensing means includes a contact-sensitive switch positioned on said carrier to be contacted by the associated powered assembly when the latter is moved upwardly relative to said subcarriage.

3. The apparatus of claim 1 wherein said each assembly includes a mounting member, a shifting member mounted thereon for shifting relative thereto, and powered operating means selectively operable to shift said shifting member between raised and lowered positions, and said gripping members include a group of at least three tongs angularly disposed relative to each other and mounted on said mounting member, with each tong being pivotally dependent from said mounting member in a region spaced radially outwardly from the center of said group, and having an operating arm projecting toward said central region, said arm being operatively connected to said shifting member, wherein shifting of said shifting member between its raised and lowered positions produces movement of said tongs between their article-gripping and release positions, respectively.

* * * * *